Sept. 22, 1959 E. S. PETERSON 2,905,769

TIME ANNOUNCING SYSTEM

Filed Aug. 30, 1955 4 Sheets-Sheet 1

INVENTOR.
EDWARD S. PETERSON
BY Wm. Walter Owen
ATTY.

Sept. 22, 1959 E. S. PETERSON 2,905,769

TIME ANNOUNCING SYSTEM

Filed Aug. 30, 1955 4 Sheets-Sheet 2

*INVENTOR.*
EDWARD S. PETERSON
*BY* Wm. Walter Owen
ATTY.

INVENTOR.
EDWARD S. PETERSON
BY Wm Watts Owen
ATTY.

Sept. 22, 1959 E. S. PETERSON 2,905,769

TIME ANNOUNCING SYSTEM

Filed Aug. 30, 1955 4 Sheets-Sheet 4

INVENTOR.
EDWARD S. PETERSON
BY Mc Walter Owen.
ATTY.

United States Patent Office 2,905,769

Patented Sept. 22, 1959

2,905,769

TIME ANNOUNCING SYSTEM

Edward S. Peterson, Elmwood Park, Ill., assignor to General Telephone Laboratories, Incorporated, a corporation of Delaware Application August 30, 1955, Serial No. 531,528

11 Claims. (Cl. 179—100.2)

This invention relates in general to sound reproducing systems, and is particularly directed to an announcement system for making periodic announcements at predetermined regular intervals, such as time announcements for telephone subscribers, and the like. It is an improvement on my Patent 2,776,341, issued January 1, 1957, which was an improvement on my Patent Re. 23,522, issued July 15, 1952.

In the stated patent Re. 23,522 a magnetic tape was employed, but the length of the tape was kept relatively short by widening it to accommodate six sound tracks for the time signals, and by reversing the tape movement every two hours, as well as by stopping the tape after each time signal, by the use of a seventh sound track on the tape to provide the necessary intermittent stop signals. Control of the reversals was located in six 12-hour cams, a 1-hour cam, and a 1-minute cam. Other control functions were concentrated in a group of 15-second, or quarter-minute cams. All of these cams were driven at their respective speeds by a synchronous clock motor through four shafts and a relatively expensive gear train. This system used only one time announcement head and one stoppage control head.

In the stated Patent 2,776,341 the number of time tracks was reduced to two, thus permitting the use of a narrower and less cumbersome tape and reels. Reversals of the tape at the same time were reduced from twelve per day to only four per day, or once every six hours. This reduced the number of 12-hour cams from six to two. Excessive increase in the length of the tape was prevented by the provision of quick braking for the tape motor on the intermittent stoppages between announcements. This permitted reduction of the space between successive announcements on the tape. This system used two time-announcement heads and one control head, with the capstan drive between the two time heads.

One object of the present invention is the provision of a simplified reversing and control system wherein the clock motor is arranged to drive a single 15 second cam shaft, and the tape itself is made to control the reversals as well as the stoppages. The 12-hour cam shaft, the 1-hour cam shaft, and the 1-minute cam shaft are no longer required.

Another object of the invention is the provision of an improved tape driving means whereby the tape is always pulled in a positive manner over the time-announcement and stoppage-control heads at all times.

A feature of the invention is the provision of special terminal posts in the path of the tape, through which a tape reversing circuit is closed by the passage of a metallic spot on the tape at the end of each six-hour period. Means is also provided to prevent the breaking of the circuit through the tape.

Another feature of the invention is the provision of means for controlling the completion of the reversal process through one of the 15-second cams, so that the actual reversal takes place at the conclusion of the final announcement for the period, shortly after preparation for the reversal has been made by the spot on the tape.

Another feature of the invention is the provision of separate tape driving pressure rollers for each direction of travel, which rollers are located next to the reels, with the tape extending beyond them in a loop embracing the two tape reversing terminal posts, the two time announcement heads, and the control head, with the control head in the center between two idler rollers.

Other features and advantages of the system will be made apparent by the following description, when considered with reference to the accompanying drawings, comprising Figures 1 to 7 inclusive.

Figure 3:
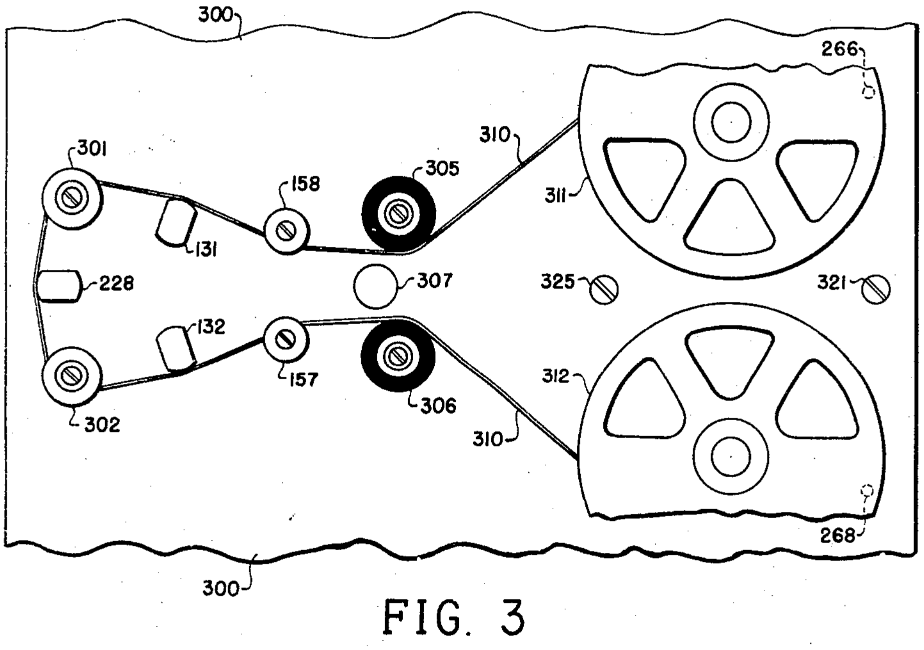
Fig. 3 shows a portion of the tape driving mechanism, as seen from the front of the mounting panel.

With further reference to the drawings, Fig. 3 shows the two tape reels 311 and 312 one mounted above the other on an upright panel 300, and partly broken away to conserve space on the drawing. When the device is in operation, these reels tend to rotate away from each other, under the control of two light duty tension motors shown only in Fig. 1 as the rectangles 183 and 184.

From the reels, the tape 310 passes over the inside face of two pressure rollers 305 and 306, which are arranged to be raised or lowered, so as to bring one of them into engagement with the capstan 307 for driving the tape in one direction or the other.

Figure 7:
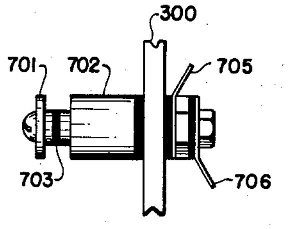
Fig. 7 is an enlarged side view of one of the tape reversing terminal posts.

From the pressure rollers, the tape passes over the inside face of the depressed tape guide in the reversing posts 158 and 157. As illustrated in Fig. 7 these posts consist of a top conductive part 701 and a bottom conductive part 702 separated by insulation such as indicated at 703. Extensions of both parts, properly insulated by means of insulating tubes not shown, extend through the mounting panel 300 and are connected on the back of the panel to insulated terminal lugs such as 705 and 706.

From the reversing posts 158 and 157 the tape passes over the outer face of the two time announcement heads 131 and 132 from whence it passes over the outer face of the depressed tape guide in the two freely rotatable idler rollers 301 and 302 and finally over the outer face of the stop control head 228, which is now in the center of the drive rather than on one side as previously.

Figure 4:
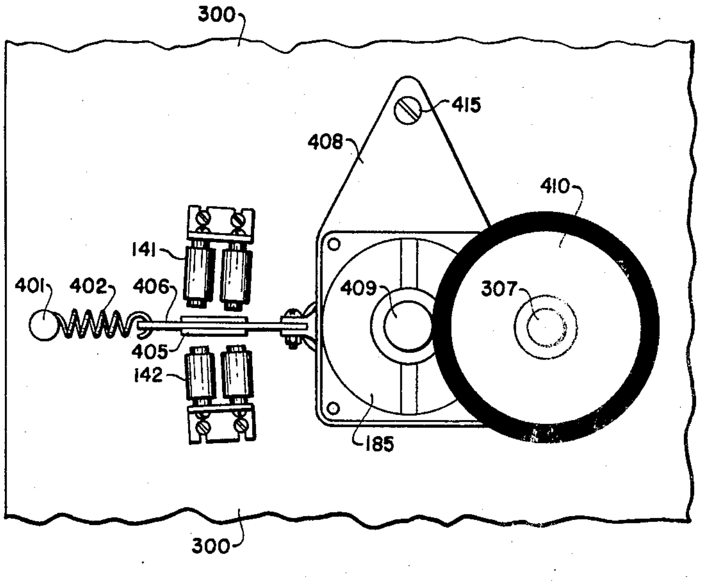
Fig. 4 is a rear view of the tape driving mechanism of Fig. 3, including the capstan motor and drive wheel.

The capstan 307, which is rotatably mounted in a suitable bearing not shown, in the panel 300, is arranged to be rotated in one direction or the other by a reversible A.C. motor 185 shown in Fig. 4. This motor is mounted on the back of the plate 300 on an auxiliary plate 408, which is held in spaced apart relation with the main plate by a heavy spacer post not shown, but secured by the screw 415. The shaft 409 of this motor is in permanent engagement with a rubber-tired drive wheel 410, which is rigidly secured to the capstan 307.

Figure 5:
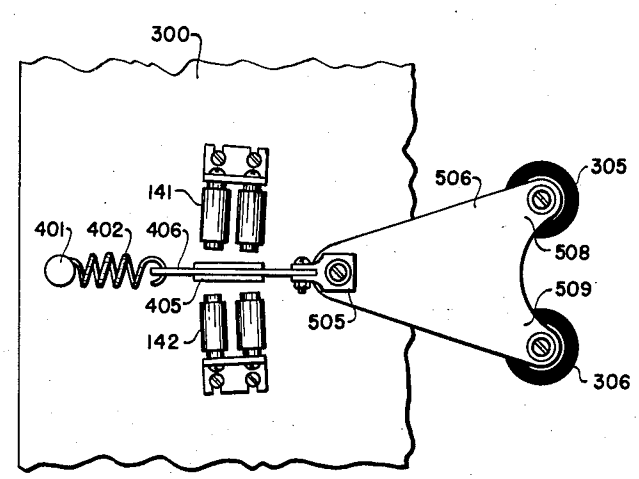
Fig. 5 is a rear view corresponding to Fig. 4 with the capstan motor and drive wheel removed, to show the pressure roller control arm.
Figure 6:
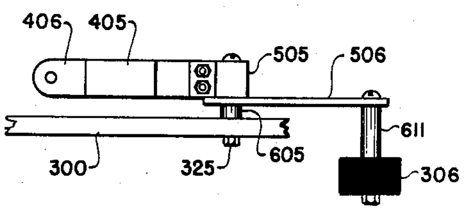
Fig. 6 shows the pressure roller control arm on a reduced scale, as seen from below, and with intervening parts removed.

The two-rubber-clad pressure rollers 305 and 306 are rotatably mounted on posts such as 611 (Fig. 6) which project through holes of considerably larger diameter than themselves in the panel 300, just above and below the capstan 307. The rearward ends of these bearing posts 611 are rigidly secured to upper and lower arms 508 and 509 (Fig. 5) of a triangular shaped rocking plate 506. The rocking plate 506 in turn, is rigidly secured to a yoke 406 through a bearing block 505, the entire assembly being pivotally mounted on a bearing post 605 mounted on the back of the panel 300. The free end of the yoke 406 is resiliently connected to a post 401 through the coiled spring 402 in such a way as to normally hold the assembly in the central or neutral position as illustrated. Magnetic iron armature plates 405 are secured to the upper and lower faces of the yoke 406, between the working ends of two sets of pressure roller magnets 141 and 142.

Thus, for driving the tape and the reels in a clockwise direction as seen from the front, the upper magnet 141 is operated and maintained operated. This raises the yoke 406 and lowers the rocking plate 506, thereby bringing the upper pressure roller 305 into contact with the capstan 307 so as to pinch the tape between them. The motor 185 is then caused to rotate in a direction to cause the capstan 307 to rotate in a clockwise direction as seen in Fig. 3. The roller 305 is thereby caused to rotate anti-clockwise, and between the two, the tape is wound onto the reel 311 and pulled off the lower reel 312. The upper tension motor, being now free from the pull of reel 312 will cause reel 311 to take up the tape as fast as it comes, while the greater power of the capstan motor will enable it to readily pull the tape from the lower reel against the back pull of the lower tension motor. The upper time announcement head 131 and the control head 228 are in circuit at this time, while the lower time announcement head 132 is disconnected.

For operation in the reverse direction, the lower pressure roller magnet 142 is operated. This pulls down the yoke 406, and raises the rocking plate 506, so as to bring the lower pressure roller 306 into contact with the capstan 307, with the lower loop of the tape pinched between them. At the same time the direction of rotation of capstan motor 185 is reversed, so as to drive the capstan 307 in an anti-clockwise direction. This causes roller 306 to rotate clockwise, and the tape is now wound onto the reel 312 by the lower tension motor, and pulled off the reel 311 by the capstan and the pressure roller 306. The lower time announcement head 132 and the control head 228 are now in circuit, and the upper time announcement head 131 is disconnected.

It is now apparent that the location of the capstan next to the two reels, and the use of two associated pressure rollers only one of which can be in engagement at any time, provides a positive pull on the tape over all of the elements of the tape system at all times. In the previous designs, with the capstan located between the heads, it tended to push the tape over the heads on one side. With the control head in circuit at all times, regardless of the direction of movement, this provided a hazard to fault-free operation, especially so, should the heads become dirty or sticky. The always positive pull of the present arrangement not only avoids this danger, but actually aids in keeping the heads and the reversing terminals 157 and 158 in a clean and polished condition.

Figure 1:
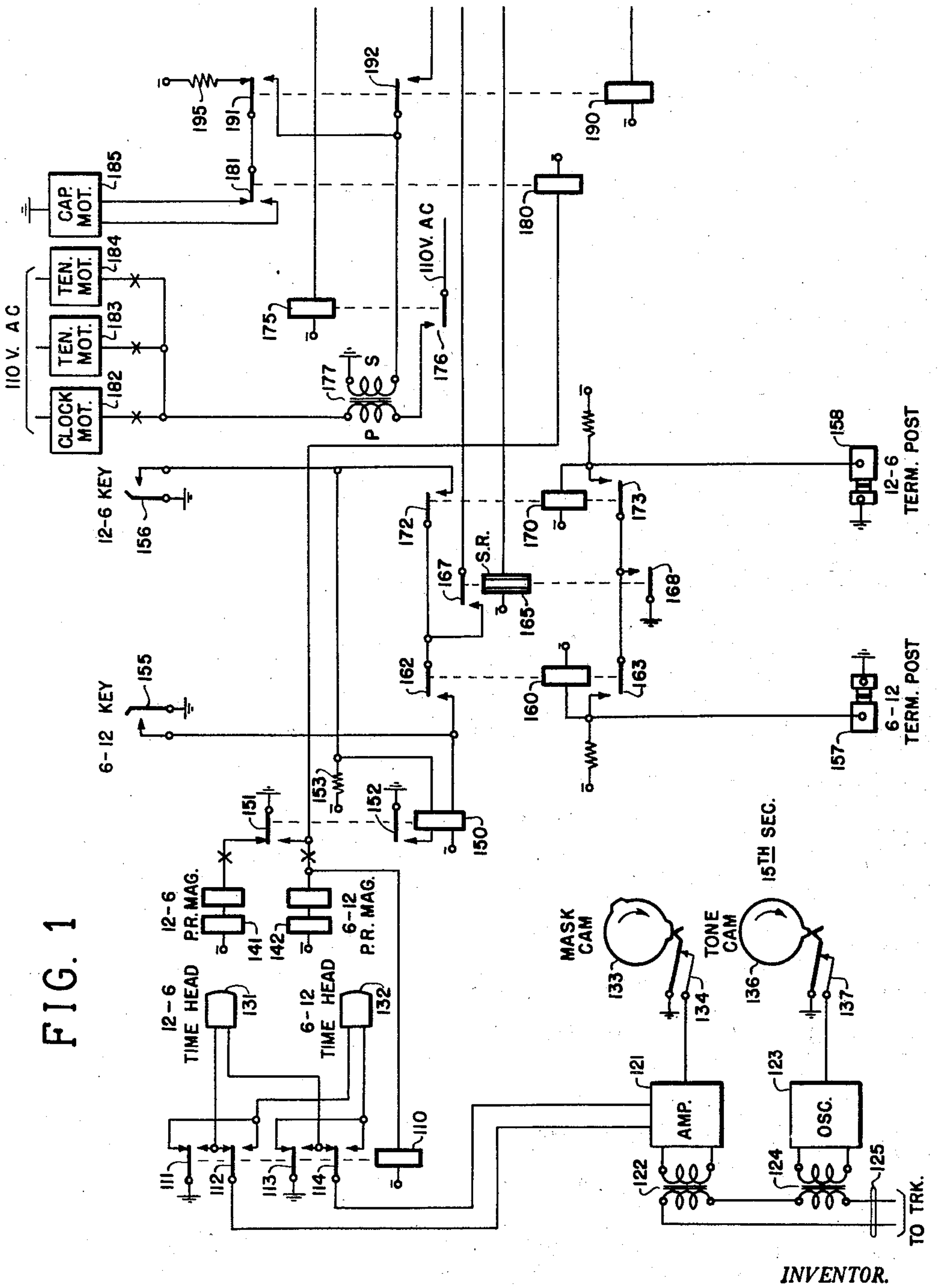
Fig. 1 shows, in circuit diagram form, a portion of the control circuit for the announcer.

In the circuit drawings, the clock motor 182, the two tension motors 183 and 184, and the capstan motor 185 are indicated by rectangles at the upper right in Fig. 1. The clock motor and the two tension motors are normally in continuous operation, but the capstan motor 185 starts and stops with each announcement, under control of relays 190, 210, and 220. The crossed lines in the leads to the two tension motors represent manual keys, not otherwise illustrated. Opening either key, with the tension motors energized and the capstan disengaged, will stop the associated tension motor and enable the other tension motor to take up tape at high speed. The pressure roller magnets 141 and 142, shown at the upper left in Fig. 1, have similar crossed lines in their leads, representing a single manual key which may be opened at any time to disconnect these magnets. Other elements shown in Fig. 1, in addition to the eight relays 110 to 190, are the two time heads 131, 132 which reproduce the time announcements, the tone cam 136 which controls the short splash of tone to be placed on the trunk 125 at the end of each quarter minute, the masking cam 133 which disables the main amplifier 121 at certain times during each quarter minute, the two reversing posts 157, 158, and the two direction keys 155, 156 used for starting.

Figure 2:
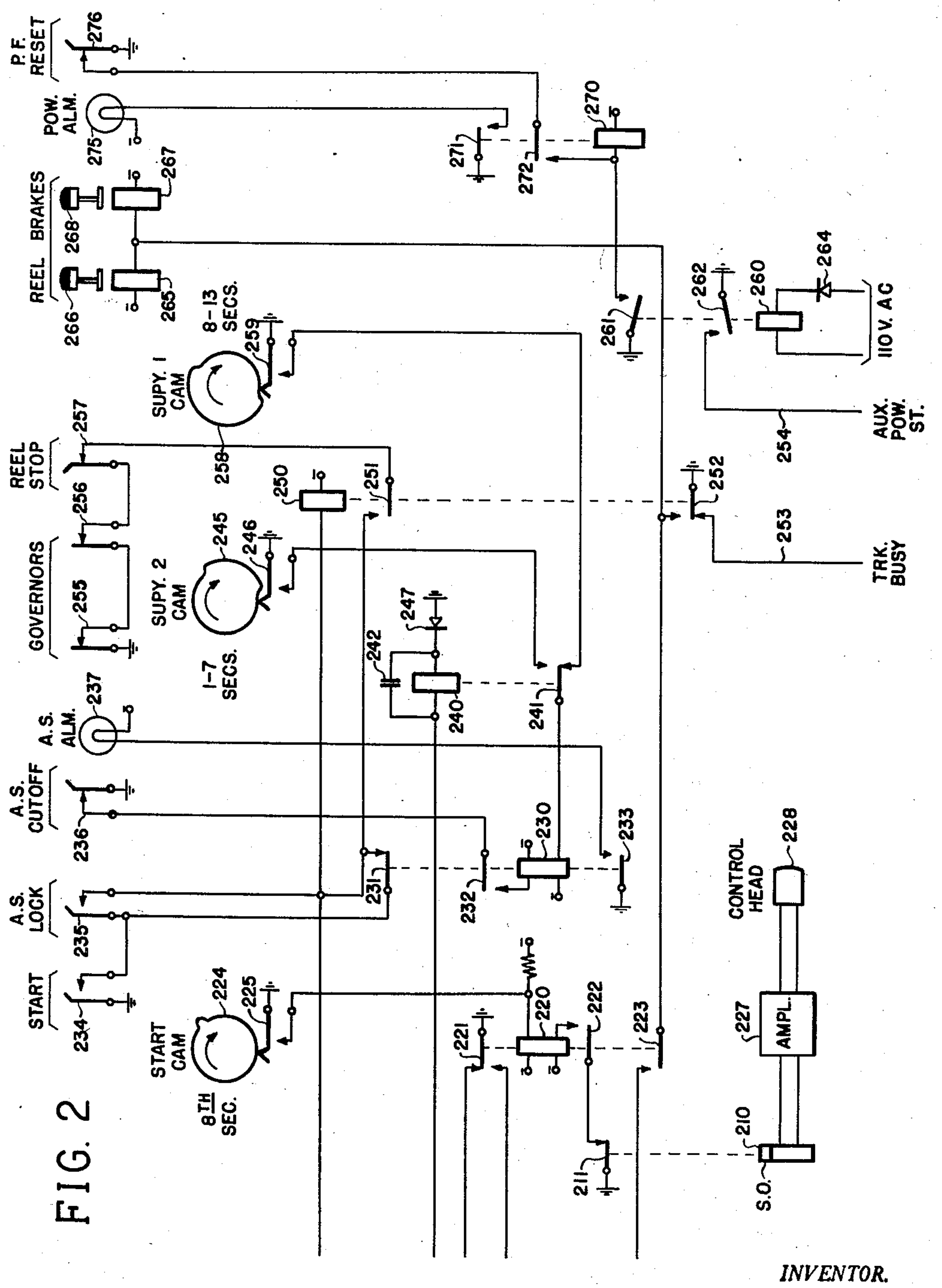
Fig. 2 shows the remainder of the control circuit, from which a few minor features have been omitted as unnecessary to the disclosure.

In Fig. 2 are shown, seven control relays numbered from 210 to 270, as well as the start cam 224 which starts the capstan motor at the start of each announcement, the control head 228 (at lower left) which stops the capstan motor at the end of each announcement, the supervisory cams 245 and 258 which guard the timing, a pair of speed governor contacts 255, 256 associated with the tension motors, and a pair of reel brake magnets 265, 267. Across the top of Fig. 2 are also a small number of keys and lamps, whose functions will be described in due course.

Since this equipment is intended primarily for use in automatic telephone exchanges, the relays are designed for operation on 48 volts direct current obtained from the exchange battery, while the various motors operate on 110 volts alternating current, which would ordinarily be obtained from the commercial power supply. A power failure relay 260 is normally held operated across this source through the rectifier 264. Should the commercial power fail, this relay releases and starts a vibrator type auxiliary supply not shown, which is operated from the exchange battery. And when the commercial power returns, relay 260 re-operates and opens the auxiliary start circuit.

With respect to the operation, it should be noted that this time announcer can be started at any time during the day, at the start of any quarter minute, instead of only at 6 o'clock and 12 o'clock as previously. This is a very considerable advantage for re-starting the machine after a shut-down for repair or servicing or for any other cause.

The first step in starting is to set the cams on the zero or 15-second point, so as to bring all of the cams to the position illustrated. This is easily done by means of a scale, not shown, associated with the cams. The direction key 155 or 156 is then operated, depending on whether the starting time is between 6 and 12 or between 12 and 6. In the former case, the operation of key 155 will cause pressure roller shift relay 150 to operate and lock to battery through resistor 153. Relay 150 also, at make contacts 151 closes parallel circuits to the 6–12 pressure roller magnet 142, the head shift relay 110, and the capstan motor reversing relay 180. Magnet 142 causes pressure roller 306 to press the lower tape section against the capstan 307, relay 180 prepares the anti-clockwise rotation of the capstan, and relay 110 connects the amplifier 121 to the time head 132 associated with the 6–12 time track. In the second case, the operation of the 12–6 key 156, will shunt down relay 150 in obvious manner, should it be operated, thereby releasing magnet 142 and relays 180 and 110, and causing the operation of pressure roller magnet 141. Roller 305 will thereupon press the upper tape section against the capstan 307, relay 180 will prepare the clockwise rotation of the capstan, and relay 110 will connect the amplifier 121 to the time announcement head 131 associated with the 12–6 time track.

If the start key 234 is now operated, a circuit will be closed through break contacts 231 to relays 175 and 250 in parallel, and these two relays will operate quickly. Clock start relay 175 upon operating, at contacts 176 starts the clock and tension motors 182, 183, 184 with alternating current extended through the primary of transformer 177, and the clock motor in turn starts the control cams, which make one revolution each quarter minute, as previously indicated. The key 234 may be operated at any even quarter minute point of standard time.

Guard relay 250 upon operating, at contacts 251 completes a locking circuit for itself and relay 175 to ground through the reel stop key 257 and the tension motor governor contacts 256 and 255. Relay 250 also, at break contacts 252 removes a busy marking from the time announcement trunk, and at make contacts 252 prepares a circuit for relay 190 and closes a circuit to the reel brake magnets 265 and 267, which operate in parallel. These magnets, which are mounted on the back of the panel 300 behind the reels, thereupon attract a pair of rubber-tipped brake rods 266 and 268 which project through the panel. These rods, the ends of which are indicated by the dotted circles 266 and 268 at the right of Fig. 3, are held against the back of the reels by spring tension when the machine is shut down, to prevent movement of the reels. The retraction of these rods accordingly frees the reels.

With the starting of the clock motor, all of the control cams start rotating, and after 8 seconds start cam 224 closes its contacts 225 which operate the capstan motor trigger relay 220. Relay 220 thereupon, at contacts 222 locks to break contacts 211, at contacts 221 operates the tape reversal timing relay 165, without immediate effect, and at contacts 223 operates the capstan motor start relay 190, from ground through contacts 252.

Assuming the start to be in a 12–6 period of the day or night, and that relays 110, 150 and 180 are in the normal position, as in the drawing, the operation of relay 190 now closes an alternating current circuit to capstan motor 185 from the secondary of transformer 177, through make contacts 191, and break contacts 181. Relay 190 also, at contacts 192 operates the abnormal sequence timing relay 240 in this circuit, from half cycles of current passed through the disc rectifier 247. If the supervisory cams 245 and 258 are in their proper positions, the operations of relay 240 will be without effect, and may be ignored for the moment.

The capstan motor now drives the tape in the 12–6 direction, and the 12–6 time announcement head 131 picks up the time announcement first to pass over it, for repetition to the trunk 125, by way of break contacts 112 and 114, amplifier 121 and transformer 122, and which may be diverted to a loud-speaker not shown. Since this first announcement will most usually not give the correct time, it will be necessary to move the tape, in one direction or the other. This is most easily done by stopping the clock motor at the next quarter minute by opening a key not shown, but indicated by crossed lines in the lead to motor 182. The tape is then moved an appropriate amount by opening the circuit to one of the tension motors, by means of a similar key, to which reference has already been made. The clock is then again started, and the tape again monitored. This is repeated as often as necessary, and when the time is correct, the machine is left running, and the loudspeaker is disconnected.

Immediately after each time announcement, a signal in the control track is picked up by the control head 228. This signal, after amplification by the amplifier 227, energizes the capstan motor stop relay 210. This relay, which is made slow to operate, as by the use of a copper slug over the armature end of the core, operates after a slight delay, and unlocks and releases trigger relay 220. Relay 220 in turn, at contacts 223 releases start relay 190, and at contacts 221 opens the circuit to reversal timing relay 165. Relay 190, upon releasing, opens make contacts 192 and releases relay 240 without effect, at make contacts 191 opens the A.C. circuit to the capstan motor, and at break contacts 191 closes a direct current circuit to the capstan motor through resistor 195 to negative battery. This brakes the motor to an instant stop, which stops the tape instantly as well. Relay 165, which is made slow to release, as by the use of a copper sleeve over its core, releases shortly after the opening of its circuit by relay 220, but this release is without effect at this time.

At the end of each quarter minute, exactly on the 15th second, tone cam 136 closes its contacts 137. This starts the oscillator 123 which puts an amplified tone signal on the trunk momentarily, through the transformer 124. The contacts 137 open immediately thereafter, and the tone is removed. After eight seconds of the next quarter minute have elapsed, start cam 224 re-operates trigger relay 220, and the cycle repeats.

Between the announcements, and during certain switching operations, the masking cam 133 closes its contacts 134. This temporarily disables the main amplifier 121, as by changing the plate voltages, in order to prevent circuit clicks and the like from being amplified and passed out to the trunk.

At the end of the 12–6 period, some time after timing relay 165 has operated, in the last quarter minute before six o'clock, a spot of silver on the 6 o'clock end of the tape bridges the two terminals of the 6–12 reversal post 157, thereby causing the operation of tape reversal relay 160 in obvious manner. Relay 160 thereupon, at contacts 162 prepares a circuit for pressure roller shift relay 150, and at contacts 163 closes a locking circuit for itself, to ground through make contacts 168.

At the end of the final announcement therefore, when stop relay 210 operates from control head 228, and causes the release of trigger relay 220, the latter relay, as before, opens make contacts 223 and releases start relay 190 to stop the tape, and at make contacts 221 opens the circuit to timing relay 165. The latter holds its contacts for an instant however, during which time break contacts 221 of trigger relay 220 close a circuit through make contacts 167 and 162 to the lower winding of the pressure roller shift relay 150.

Pressure roller shift relay 150 upon operating, at contacts 152 locks to resistor 153, and at contacts 151 releases pressure roller magnet 141 and operates pressure roller magnet 142. Head shift relay 110 and the capstan motor reversing relay 180 also operate from make contacts 151, in parallel with magnet 142. Relay 110 disconnects the 12–6 time head 131 from the amplifier 121, and connects up the 6–12 time head 132, in its place. Relay 10 also connects ground to both terminals of the disconnected head in both of its positions, for neutralizing purposes. Relay 180, at the same time, at contacts 181 reverses the capstan motor connections, to prepare the reversal of the tape movement. Relay 165 then releases without effect.

Upon the next operation of trigger relay 220 from start cam 224, in the first quarter minute after the six o'clock announcement, this relay locks in the usual manner, and at contacts 221 and 223 again operates relays 165 and 190. Relay 165 again closes the locking circuit of reversal relay 160, while contacts 167 are without effect due to the open break contacts 221. Relay 190 at contacts 192 reoperates relay 240, and at contacts 191 connects induced A.C. from transformer 177 to the capstan motor 185, through make contacts 181. The capstan motor is thereby caused to drive the tape momentarily in the 6–12 direction, thereby causing the time head 132 to make the first time announcement of the new period, such as "At the tone the time will be—six o'clock and fifteen seconds."

During this movement of the tape, the silver spot is backed off of the reversing post 157, thus opening the operate circuit of relay 160. Relay 160 is now locked to contact 168 of the operated relay 165 however, so that no current is broken by the silver. At the conclusion of the announcement when trigger relay 220 is again released to stop the tape, the circuit to the lower winding of relay 150 is again closed momentarily through contacts 167 and 162. This is without effect, since this relay is already operated and locked. And when relay 165 releases shortly thereafter, it opens this circuit at contacts 167, and at contacts 168 unlocks and releases relay 160. The tape continues to advance intermittently in this direction and make announcements for the next six hours.

At the conclusion of this 6–12 period, in the latter part of the last quarter minute before twelve o'clock, a spot of silver on the 12 o'clock end of the tape bridges the two terminals of the 12–6 reversal post 158, to cause operation of tape reversal relay 170. Relay 170 thereupon at contacts 173 locks to contacts 168, and at contacts 172 prepares a circuit for releasing pressure roller shift relay 150. The machine is now making the final announcement: "At the tone the time will be—12 o'clock exactly."

At the conclusion of this announcement, when trigger relay 220 is released by relay 210 to stop the tape, a momentary circuit is closed from ground through break contacts 221 and make contacts 167 and 172, to negative battery through resistor 153. This shunts the upper locking winding of pressure roller shift relay 150, and this relay releases. Relays 110 and 180 and pressure roller magnet 142 thereupon release, and pressure roller magnet 141 reoperates. Relay 165 then releases, and opens the shunting circuit.

Upon the next operation of trigger relay 220, relays 165 and 190 re-operate. Contacts 168 of relay 165 now re-close the locking circuit of relay 170, while relay 190 starts the tape moving in the 12–6 direction, and causes the time head 131 to make the announcement for the first quarter minute of the new time period. The silver spot is backed off of the reversal post 158 during this movement, and when relay 165 releases at the end of the announcement contacts 168 thereof unlock and release relay 170. During the short interval between the releases of trigger relay 220 and timing relay 165, the circuit to resistor 153 is again closed momentarily, through contacts 167 and 172, but this is without effect, due to the now open contacts 152 of shift relay 150. The machine continues to operate in this manner, reversing itself each six hours, until stopped, or shut down for servicing, or due to trouble conditions.

Should the cams get out of step at any time, the abnormal sequence alarm relay 230 will operate, from one or the other of the supervisory cams 245 and 258. Abnormal sequence timing relay 240 operates, as has been shown, at approximately the 8th second of each quarter minute, and releases after the time announenent, at about the 14th second. Cam 245 has its contacts 246 closed under normal conditions, between the 1st and 7th seconds, when relay 240 is normal, while cam 258 has its contacts 259 closed only between the 8th and 13th seconds, when relay 240 is in the operated position. As long as the timing is correct therefore, there is never any circuit for relay 230. Should relay 240 be operated when it should be released however, or the contacts 246 or 259 closed when they should be open, or vice versa, relay 230 will operate quickly, and lock to cutoff key 236. Relay 230 at the same time, at contacts 233 lights the abnormal sequence alarm lamp 237, and at contacts 231 unlocks and releases clock relay 175 and guard relay 250, thereby stopping the machine. The machine can be re-started to study the operation however, by operating the abnormal sequence lock key 235 and then operating start key 234 momentarily. Contacts 235 now shunt contacts 231, so that relay 230 can no longer stop the machine. If it is desired to observe the operation of relay 230, this can be done by opening its locking circuit at the abnormal sequence cutoff key 236.

Should either of the tension motors start operating at excessive speed at any time, as during a rewinding operation, or during regular operation, due to a broken tape, the associated governor, not shown, will operate the contacts 255 or 256, as the case may be. The opening of either of these series contacts will unlock and release relays 175 and 250, and stop the machine. No special alarm is operated in such a case, but contacts 252 of relay 250 cause the trunk to give a busy signal to anyone calling the time service number.

If the commercial power fails at any time, power failure relay 260 will release immediately. Relay 260 thereupon, at contacts 262 grounds the auxiliary power supply start lead 254, and at contacts 261 operates power alarm relay 270. Relay 270 locks to reset key 276 and lights alarm lamp 275. Relay 260 will re-operate automatically when the commercial power comes back on, but relay 270 will have to be released manually, by the operation of reset key 276.

While there has been described a particular embodiment of the invention, it will be understood that various modifications may be made therein without departing from the spirit and scope of the invention, as defined in the sub-joined claims.

What is claimed is:

1. Equipment for use with a time announcement device comprising a record medium having a pair of sound tracks thereon representing six-hour time divisions of a day, time announcements recorded in opposite directions in the respective sound tracks, said announcements representing shorter time divisions within said first divisions, drive means, means for causing said drive means to move said record medium in a particular direction corresponding to a particular one of said first time divisions, means for causing said announcement device to reproduce the announcements of a particular one of said sound tracks corresponding to said one time division responsive to said movement, means for stopping said drive means and said record medium at the end of each said announcement, means for starting said drive means and said record medium at the beginning of each said announcement, means for reversing said drive means and said record medium at the end of each of said first time divisions for reproducing the announcements of a different sound track, a cam, a timer for continuously driving said cam at a speed corresponding to only one of said time divisions, circuit means for automatically controlling said starting and stopping and reproducing and reversing means, and means for controlling said circuit means entirely from said record medium and said cam.

2. Equipment for use with a time announcement device comprising a recording medium having a plurality of sound tracks therein representing equal longer time divisions of a day, time announcements recorded in opposite directions in alternate ones of said sound tracks, said announcements representing shorter equal time divisions within said longer divisions, drive means for moving said recording medium in either direction to cause said device to reproduce the announcements of one of said sound tracks, means for reversing said drive means and said recording medium at the end of said longer equal time divisions for reproducing the announcements of another of said sound tracks, means for starting and stopping said drive means and said record medium at the beginning and end respectively of each said announcement, a cam, a timer for continuously driving said cam at a speed corresponding to one of said shorter time divisions, circuit means for controlling said starting and stopping and reversing means, and means for controlling said circuit means entirely from said cam and said recording medium.

3. Equipment for use with a time announcement machine comprising a record medium having a pair of sound tracks therein representing equal time of day divisions, time announcements recored in one direction in one of said tracks and in the opposite direction in the other of said tracks, said time announcements representing shorter time divisions within said equal divisions, drive means for moving said record medium in either direction to cause said machine to reproduce the announcements of one of said sound tracks, a cam, a timer for continuously operating said cam at a speed of one revolution for each of said shorter time divisions, a start relay, means for operating said relay from said cam at the start of each of said shorter divisions, means operated responsive to said relay operation for causing said drive means to advance said record medium for making an announcement, means for releasing said relay at the end of each announcement to cause said drive means to stop said record medium, a reversing relay normally held in one posiiton or the other to determine the direction of movement of said record medium, a direction shift relay, means for operating said last relay from said medium during the last of said shorter periods within one of said longer periods, and means operated responsive to said last relay operation and the next following release of said start relay for changing the position of said reversing relay at the end of the final announcement of the time of day division.

4. Time announcing equipment as in claim 3, including an electrically conductive section at the end of said record medium, a pair of contacts engaged by said conductive section during said final announcement for operating said direction shift relay, means for locking said shift relay independently of said conductive section, and means operated responsive to the operation of said machine in the reverse direction for unlocking said relay after said conductive section has been disengaged from said contacts so that no current is interrupted by said conductive section.

5. Time announcing equipment as in claim 3 wherein said record medium is a non-conductor, a short conductive section at the end of said medium, a pair of contacts in the path of said medium bridged by said conductive section during the final announcement of a time of day division for operating said direction shift relay, means for holding said shift relay operated independently of said contacts until said conductive section has been withdrawn from said contacts during the first announcement of the succeeding time of day division, and means for releasing said shift relay independently of said contacts responsive to the operation of said machine during said first announcement of the succeeding time of day division.

6. Equipment for use with a time announcement machine comprising an electrically non-conductive record medium having a pair of sound tracks therein representing equal time of day divisions, time announcements recorded in one direction in one of said tracks and in the opposite direction in the other of said tracks, drive means for moving said record medium in either direction to cause said machine to reproduce the announcements of one of said sound tracks, a start relay, means for operating said start relay at the beginning of each said announcement, means for releasing said relay at the end of each said announcement, means operated responsive to each said operation and release of said relay for causing said drive means to start and stop said movement of said record medium before and after each said announcement, a conductive section at each end of said record medium, a first pair of contacts bridged by one of said sections at the end of one of said time of day divisions, a second pair of contacts bridged by the other of said sections at the end of the other of said time of day divisions, a first and a second direction shift relay, means for operating one of said last relays responsive to the bridging of one of said pairs of contacts, a reversing relay normally held in one position or the other to determine the direction of movement of said medium, and means operated responsive to the operation of either one of said relays and the final release of said start relay at the end of the final announcement of the involved time of day division for reversing the position of said reversing relay.

7. Time announcing equipment as in claim 6, wherein said conductive section is withdrawn from in bridge of said contacts during the first announcement of the succeeding time of day division, means for locking said operated direction shift relay independently of said contacts during such withdrawal, and means operated responsive to the next release of said start relay at the conclusion of said first announcement for disabling said locking means and releasing said direction shift relay.

8. In a reversible announcement machine employing a record medium having a control signal track and a pair of announcement sound tracks with announcements recorded in opposite directions in each sound track, a pair of reels for winding said medium in either direction, a control head for said signal track located on a line representing the mid-point between said reels, an idler roller on either side of said control head and said mid-point line, an announcement head on either side of said mid-point line between said idler rollers and said reels, a split terminal post on either side of said mid-point line between said announcing heads and said reels, a pressure roller on either side of said mid-point line between said posts and said reels, the portion of said record medium lying between said reels being arranged in an open loop engaging said respective heads, posts and rollers, a capstan located on said mid-point line between said pressure rollers in the open end of said loop, means for rotating said capstan in either direction for moving said medium over said heads and said terminal posts toward one of said reels, means operated responsive to said movement for causing said control head to send control signals to said machine and for causing one of said announcement heads to reproduce the announcements in one of said sound tracks, a conductive section in said medium at each end of said sound track for engaging one of said terminal posts during the final announcement of said sound track, means operated responsive to said engagement for reversing the direction of rotation of said capstan, and means for causing one or the other of said pressure rollers to engage said capstan at all times to pull said medium in a positive manner over all of said heads and said terminal posts for both directions of movement of said medium.

9. In a reversible type announcement machine employing a record medium having a plurality of sound tracks with announcements recorded in opposite directions in different ones of said sound tracks, a pair of juxtaposed reels for taking up said medium in either direction, a plurality of sound reproducing heads arranged so that the portion of said medium extending between said reels is passed thereover in the form of a loop, a capstan located between the ends of said formed loop adjacent said reels, a pair of pressure rollers adjacent said capstan on opposite sides thereof and on the outer sides of said record medium, a first and a second electromagnet for engaging one or the other of said pressure rollers with said capstan to grip said medium between them, means for then rotating said capstan in a direction to cause it to pull said medium over all of said heads and onto the reel adjacent said gripped point to cause one of said heads to reproduce the announcements on one of said sound tracks, and means for operating said electromagnets automatically in turn at the end of each said sound track and for reversing said capstan operation responsive to the operation of said machine to cause said capstan to pull said medium over all of said heads and onto the other reel to cause another of said heads to reproduce the announcements on another of said sound tracks.

10. In a reversible type announcement machine employing a record medium having a plurality of sound tracks with announcements recorded in opposite directions in different ones of said sound tracks, a pair of juxtaposed reels for taking up said medium in either direction, a plurality of sound reproducing heads arranged so that the portion of said medium extending between said reels is passed thereover in the form of a loop, a capstan located between the ends of said formed loop adjacent said reels, a pair of pressure rollers adjacent said capstan on opposite sides thereof and on the outer sides of said record medium, a pivoted rocker arm for said pressure rollers, an armature for turning said rocker arm in either direction to cause one of said rollars to engage said capstan and grip said medium between them, means for then rotating said capstan in a direction to cause it to pull said medium over all of said heads towards the reel adjacent said gripped point to cause one of said heads to reproduce the announcements on one of said sound tracks, a pair of electromagnets for moving said armature in either direction to cause said roller engagement, means for automatically operating said electromagnets in turn and reversing said capstan rotation at the end of each sound track to cause said capstan to pull said medium over all of said heads towards the other reel to cause another of said heads to reproduce the announcements in another of said sound tracks, and spring means for maintaining both of said rollers disengaged from said capstan when neither of said electromagnets is operated.

11. In a reversible announcement machine employing a record medium having a control signal track and a pair of announcement sound tracks with announcements recorded in opposite directions in each sound track, a pair of take up reels, a control head for said signal track located on an extension of the center line between said reels, a pair of announcement heads located between said control head and said reels, on either side of said center line, the portion of said medium between said reels being passed in a loop over said heads, a capstan located inside said loop and between said announcement heads and said reels, means for rotating said capstan in either direction for moving the medium toward one of said reels, means for energizing said control head for both directions of said movement for controlling said movement from said signal track, means for energizing only the announcement head on the side of the reel toward which said medium is being moved for reproducing the announcements in one of said sound tracks, a pair of pressure rollers located on either side of said capstan on the outside of said medium adjacent said reels, means for automatically engaging the proper one of said rollers with said capstan to pull said record medium in a positive manner over said energized heads for both directions of movement of said medium, an idler roller located between said control head and each of said announcement heads and each having a depressed track therein for guiding said medium over said heads, a split terminal post located between each of said announcement heads and the associated pressure roller and each having a depressed track therein for guiding said medium over said announcement heads, means for reversing the direction of rotation of said capstan and the position of said pressure rollers, a conductive portion in said medium at the end of each sound track for engaging one of said terminal posts during the final announcement for said sound track, and means operated responsive to such engagement for operating said reversing means to reverse the direction of movement of said medium.

References Cited in the file of this patent

UNITED STATES PATENTS

| | | |
|---|---|---|
| Re. 23,522 | Peterson | July 15, 1952 |
| 2,668,674 | Roberts | Feb. 9, 1954 |
| 2,694,110 | Roberts | Nov. 9, 1954 |
| 2,704,639 | Shields | Mar. 22, 1955 |
| 2,776,341 | Peterson | Jan. 1, 1957 |